(12) United States Patent
Tseng et al.

(10) Patent No.: US 9,819,225 B2
(45) Date of Patent: Nov. 14, 2017

(54) NETWORK DISTRIBUTED HIGH VOLTAGE DIRECT CURRENT POWER SUPPLY MANAGEMENT METHOD

(71) Applicant: GCCAlliance Inc., Beijing (CN)

(72) Inventors: Stone Tseng, Beijing (CN); Zhi Li, Beijing (CN); Zhiqiang Wang, Beijing (CN); Ning Li, Beijing (CN)

(73) Assignee: GCCAlliance Inc., Beijing (CN)

( * ) Notice: Subject to any disclaimer, the term of this patent is extended or adjusted under 35 U.S.C. 154(b) by 0 days.

(21) Appl. No.: 15/107,952

(22) PCT Filed: Dec. 25, 2014

(86) PCT No.: PCT/CN2014/094872
§ 371 (c)(1),
(2) Date: Jun. 24, 2016

(87) PCT Pub. No.: WO2015/096752
PCT Pub. Date: Jul. 2, 2015

(65) Prior Publication Data
US 2016/0329739 A1   Nov. 10, 2016

(30) Foreign Application Priority Data
Dec. 26, 2013   (CN) .......................... 2013 1 0727558

(51) Int. Cl.
*H02J 9/00*   (2006.01)
*H02J 9/06*   (2006.01)
(Continued)

(52) U.S. Cl.
CPC ................ *H02J 9/061* (2013.01); *H02J 1/00* (2013.01); *H02J 3/36* (2013.01); *H02J 7/007* (2013.01);
(Continued)

(58) Field of Classification Search
CPC .......... H02J 1/12; H02J 7/0052; H02J 7/0063; H02J 7/0068; H02J 7/022; H02J 9/061; H02J 2007/0059; H02J 7/34
(Continued)

(56) References Cited

U.S. PATENT DOCUMENTS

2014/0157008 A1*  6/2014  Ammu ...................... G06F 1/30
                                                        713/300
2015/0180232 A1*  6/2015  Mino ........................ H02J 1/08
                                                         307/23

FOREIGN PATENT DOCUMENTS

CN          201839059 A       5/2011
CN          102214945 A      10/2011
(Continued)

*Primary Examiner* — Rexford Barnie
*Assistant Examiner* — Toan Vu
(74) *Attorney, Agent, or Firm* — SZDC Law P.C.

(57) ABSTRACT

A Network Distributed High Voltage Direct Current Power Supply Management Method, includes the following steps: multiple high voltage direct current power supply devices are deployed in parallel connected, ensuring that at least one high voltage direct current power supply device not needs to connect with load; there are four power supply modes pre-set in each high voltage direct current power supply device, and the first detection node and the second detection node are set in each device; detect the status of the first detection node and the second detection node, and adopt the predetermined method to change the power supply mode of the high voltage direct current power supply device as per the predetermined condition.

2 Claims, 3 Drawing Sheets

Step 1: Pre-setting Four Power Supply Modes in a High Voltage Direct Current Power Supply Device Mode A: a rectifier module in the High Voltage Direct Current power supply device converting AC into DC to supply power to a load connected with the High Voltage Direct Current power supply device, in the meantime, to charge a battery inside the High Voltage Direct Current power supply device.

Mode B: the rectifier module in the High Voltage Direct Current power supply device converting AC into DC to supply power to the load connected with the High Voltage Direct Current power supply device, in the meantime, to charge the battery inside the High Voltage Direct Current power supply device, and to supply power to a DC Grid.

Mode C: the battery inside the High Voltage Direct Current power supply device discharging, to supply power to the load connected with the High Voltage Direct Current power supply device, in the meantime, the High Voltage Direct Current power supply device inputting DC from the DC Grid, to supply power to the load connected with the High Voltage Direct Current power supply device.

Mode D, the High Voltage Direct Current power supply device inputting DC from the DC Grid, to supply power to the load connected with the High Voltage Direct Current power supply device, in the meantime, to charge the battery inside the High Voltage Direct Current power supply device.

(51) Int. Cl.
  *H02J 1/00* (2006.01)
  *H02J 7/00* (2006.01)
  *H02M 7/04* (2006.01)
  *H02J 3/36* (2006.01)
(52) U.S. Cl.
  CPC .......... *H02J 7/0052* (2013.01); *H02J 7/0068* (2013.01); *H02J 9/00* (2013.01); *H02M 7/04* (2013.01); *H02J 2007/0059* (2013.01)
(58) Field of Classification Search
  USPC .......................................................... 307/66
  See application file for complete search history.

(56) References Cited

FOREIGN PATENT DOCUMENTS

| CN | 103441562 A | 12/2013 |
|----|-------------|---------|
| CN | 103683270 A | 3/2014  |
| CN | 103701189 A | 4/2014  |

\* cited by examiner

Step 1: Pre-setting Four Power Supply Modes in a High Voltage
Direct Current Power Supply Device Mode A: a rectifier module in the High Voltage Direct Current power supply device converting AC into DC to supply power to a load connected with the High Voltage Direct Current power supply device, in the meantime, to charge a battery inside the High Voltage Direct Current power supply device.

Mode B: the rectifier module in the High Voltage Direct Current power supply device converting AC into DC to supply power to the load connected with the High Voltage Direct Current power supply device, in the meantime, to charge the battery inside the High Voltage Direct Current power supply device, and to supply power to a DC Grid.

Mode C: the battery inside the High Voltage Direct Current power supply device discharging, to supply power to the load connected with the High Voltage Direct Current power supply device, in the meantime, the High Voltage Direct Current power supply device inputting DC from the DC Grid, to supply power to the load connected with the High Voltage Direct Current power supply device.

Mode D, the High Voltage Direct Current power supply device inputting DC from the DC Grid, to supply power to the load connected with the High Voltage Direct Current power supply device, in the meantime, to charge the battery inside the High Voltage Direct Current power supply device.

Figure 2

NETWORK DISTRIBUTED HIGH VOLTAGE DIRECT CURRENT POWER SUPPLY MANAGEMENT METHOD

This application is a PCT National Stage Application of PCT/CN2014/094872, filed on Dec. 25, 2014, which claims the benefit of China Patent Application Ser. No. 201310727558.5, field on Dec. 26, 2013, which is incorporated by reference for all purposes as if fully set forth herein.

TECHNICAL FIELD

This invention belongs to the power supply management technology domain of electronics equipment, Data Centers, and facility protection, especially relates to A Network Distributed High Voltage Direct Current (HVDC) Power Supply Management Method.

BACKGROUND ART

In the current time, most IT equipment, data center, and facility room adopt the traditional Alternative Current (AC) Uninterruptible Power Supply (UPS) centralized power supply method, and the traditional UPS system adopts the double conversion, Alternative Current (AC) to Direct Current (DC) to Alternative Current (AC), to supply power to the IT equipment, which needs 2 times of conversion processes, and the traditional UPS system adopts the power management method with single measure, and could not flexibly and dynamically distribute the power as per the different electricity consumption status of each different equipment, which causes the waste of electricity. In addition, the safety and reliability of the power management method of the traditional UPS system are poor in case of any fault incurred of UPS, which the power supply of the entire data center will be impacted due to power supply incident and result in the service outage of data center.

Therefore, the current technology is imperfect and has defect, which needs to be improved.

SUMMARY OF THE INVENTION

The technical problem solved by this invention shall be that, for the flaw of the current technology, providing A Network Distributed High Voltage Direct Current Power Supply Management Method.

The technical methodology of this invention is shown as below: A Network Distributed High Voltage Direct Current Power Supply Management Method, including the following steps:

Step 1: There being four power supply modes pre-set in the High Voltage Direct Current power supply device that could be performed, mode A, the rectifier module in the High Voltage Direct Current power supply device converting AC into DC to supply power to the load connected with the High Voltage Direct Current power supply device, in the meantime, to charge the battery inside the High Voltage Direct Current power supply device; mode B, the rectifier module in the High Voltage Direct Current power supply device converting AC into DC to supply power to the load connected with the High Voltage Direct Current power supply device, in the meantime, to charge the battery inside the High Voltage Direct Current power supply device, and to supply power to the DC Grid; mode C, the battery inside the High Voltage Direct Current power supply device discharging, to supply power to the load connected with the High Voltage Direct Current power supply device, in the meantime, the High Voltage Direct Current power supply device inputting DC from the DC Grid, to supply power to the load connected with the High Voltage Direct Current power supply device; mode D, the High Voltage Direct Current power supply device inputting DC from the DC Grid, to supply power to the load connected with the High Voltage Direct Current power supply device, in the meantime, to charge the battery inside the High Voltage Direct Current power supply device;

Step 2: Multiple High Voltage Direct Current power supply devices being deployed, each High Voltage Direct Current power supply device parallel connected via DC Grid, in the meantime, at least one High Voltage Direct Current power supply device being configured to not connect with the load;

Step 3: The power supply mode of the High Voltage Direct Current power supply device that initially set to not connect with load being mode B, and the power supply mode of the High Voltage Direct Current power supply device that connects with load being mode A;

Step 4: The first detection node and the second detection node are configured on each High Voltage Direct Current power supply device;

Step 5: When one certain first detection node showing that the fault of AC input of the mentioned High Voltage Direct Current power supply device or the fault of the conversion from AC into DC, step 6 shall be proceeded; when one certain first detection node showing that the overload of the mentioned High Voltage Direct Current power supply device, step 7 shall be proceeded; when the entire second detection node showing that the output current from the mentioned High Voltage Direct Current power supply device to DC Grid reaching to the maximum load, step 8 shall be proceeded; when the first detection node and the second node of any High Voltage Direct Current power supply device showing normally, step 9 shall be proceeded;

Step 6: Change the power supply mode of the mentioned High Voltage Direct Current power supply device from mode A to mode D;

Step 7: Change the power supply mode of the mentioned High Voltage Direct Current power supply device from mode A to mode C;

Step 8: Additionally select a High Voltage Direct Current power supply device in mode A with the lowest load in the current time, and change the power supply mode of the mentioned High Voltage Direct Current power supply device to mode B;

Step 9: Recover the power supply mode of the mentioned High Voltage Direct Current power supply device to the power supply mode initially set in step 3.

A Network Distributed High Voltage Direct Current Power Supply Management Method is characterized in that, the mentioned High Voltage Direct Current power supply device containing rectifier, battery, battery management module, monitoring module, DC Grid interface, load interface, and the mentioned rectifier connecting with the mentioned AC power source, in the meantime, it being configured that the mentioned rectifier connecting with the mentioned monitoring module; the mentioned monitoring module being configured to connect with the DC Grid interface and load interface, and being configured to connect with the battery via the battery management module; the mentioned battery management module being responsible to control the charging and discharging of battery, the mentioned load interface being used to connect with the load, the mentioned DC Grid interface being used to connect with DC Grid, the mentioned rectifier being used to convert AC into DC; the mentioned monitoring module being configured to monitor and manage the rectifier, battery management module, battery status, electricity consumption status of load, and power supply status of DC Grid, and adjust and change the power supply mode.

The mentioned first detection node is configured on the connection position of the rectifier module and monitoring module of the mentioned High Voltage Direct Current power supply device; the mentioned second detection node is configured on the connection position of the mentioned High Voltage Direct Current power supply device and DC Grid.

By adopting the above-mentioned technology plan, the risk of power supply could be decentralized and minimized, and the reliability of the power supply could be improved, in the meantime, the power supply could be flexibly distributed among different power supply devices, to improve efficiency of the utilization of energy, and reduce the energy consumption.

BRIEF DESCRIPTION OF THE DRAWINGS

FIG. 2 shows four power supply modes pre-set in step 1.

DETAILED DESCRIPTION OF THE PREFERRED EMBODIMENTS

In the below, together with the drawings and specific embodiments, this invention is detailed described.

Figure 1A:
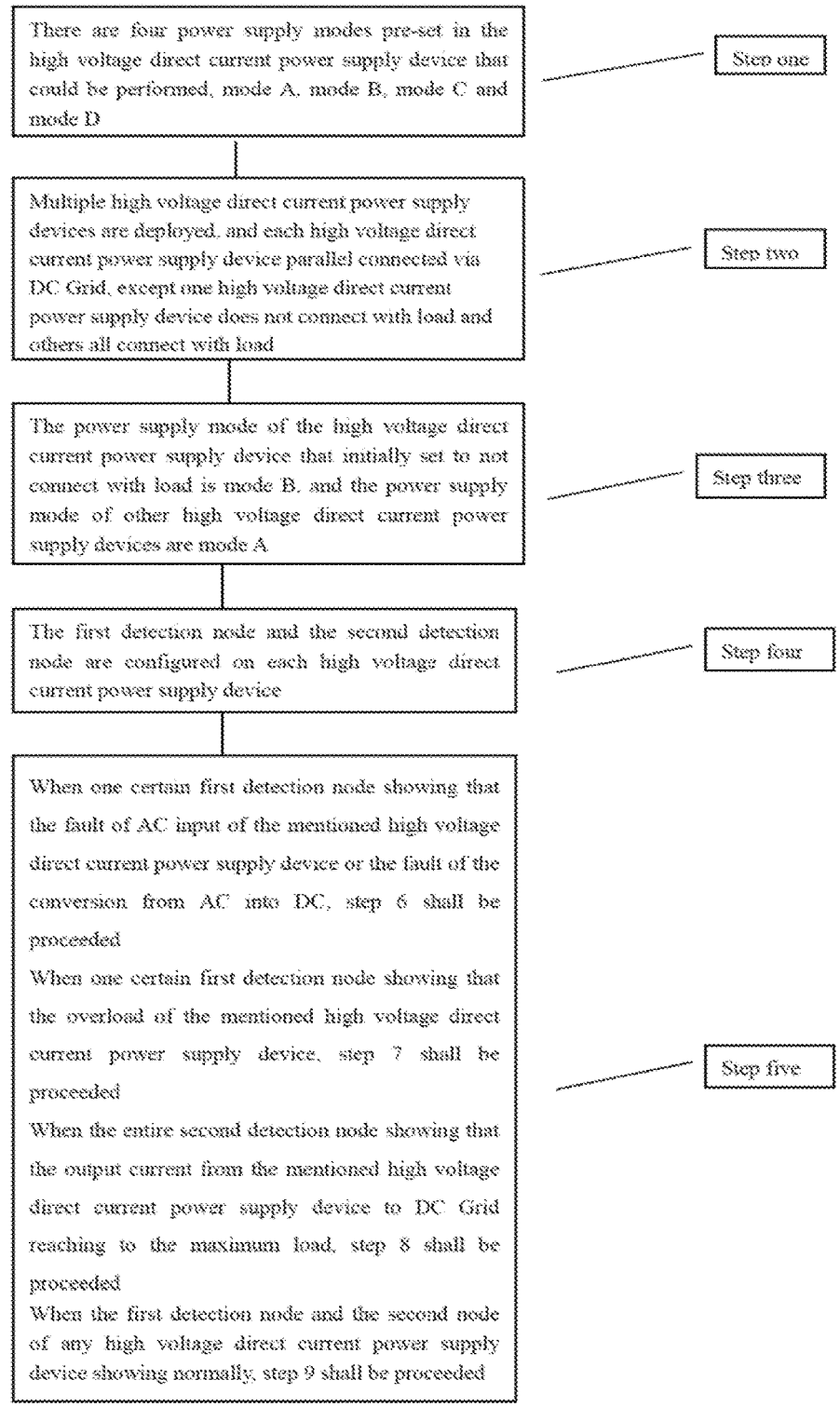
FIGS. 1a and 1b are the flowchart of A Network Distributed High Voltage Direct Current Power Supply Management Method of this invention.
Figure 1B:
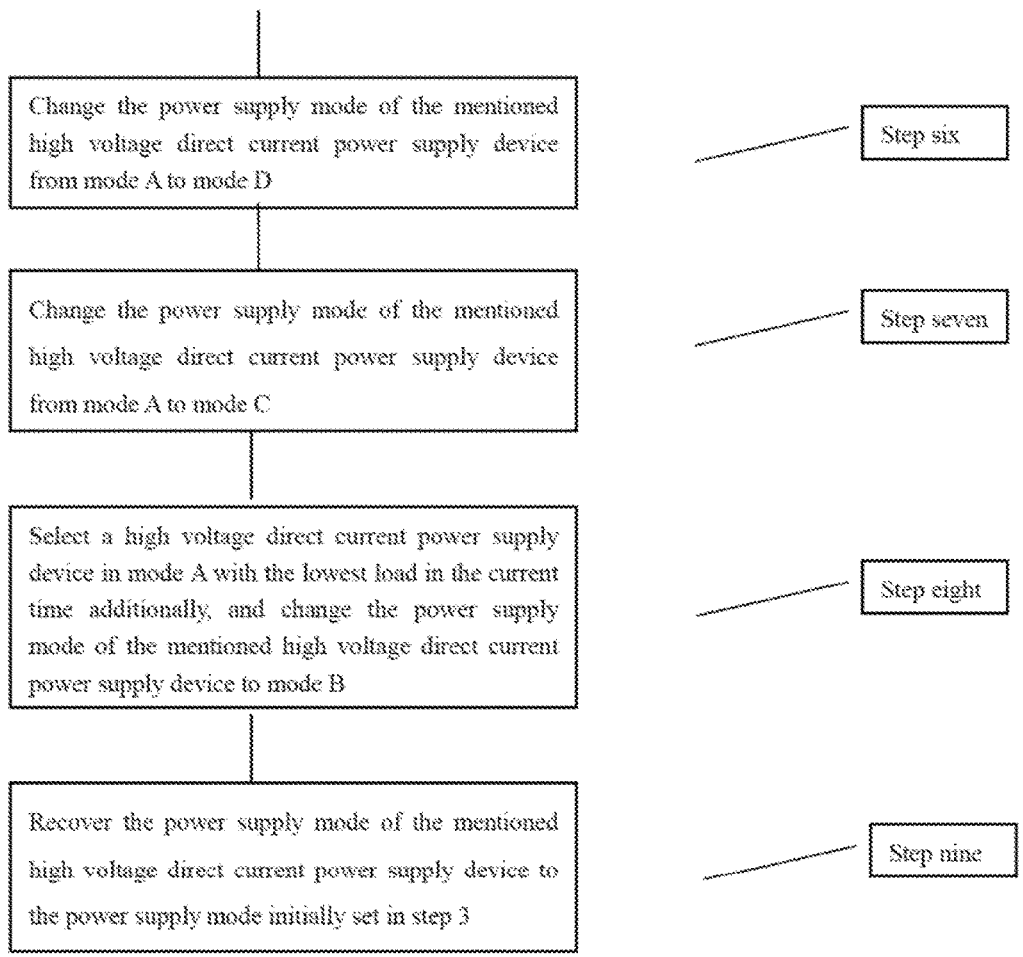

As shown in FIGS. 1a and 1b, this invention is A Network Distributed High Voltage Direct Current Power Supply Management Method, which adopts multiple High Voltage Direct Current power supply devices to supply power to each associated load; in the meantime, the entire High Voltage Direct Current power supply devices form the micro-grid that could supply power by mutual support pool. In the deployment of system, the quantity of High Voltage Direct Current power supply device shall be provided as per the quantity of electronics equipments in the equipment racks and data center, and the structure of each High Voltage Direct Current power supply device are the same, including rectifier, battery, battery management module, monitoring module, DC Grid interface, and load interface; the mentioned rectifier connects with the mentioned AC power source, the mentioned load interface is used to connect with the load, and the mentioned DC Grid interface is used to connect with the DC Grid.

A Network Distributed High Voltage Direct Current Power Supply Management Method, wherein, includes the following steps:

Step 1: There being four power supply modes pre-set in the High Voltage Direct Current power supply device that could be performed, mode A, the rectifier module in the High Voltage Direct Current power supply device converting AC into DC to supply power to the load connected with the High Voltage Direct Current power supply device, in the meantime, to charge the battery inside the High Voltage Direct Current power supply device; mode B, the rectifier module in the High Voltage Direct Current power supply device converting AC into DC to supply power to the load connected with the High Voltage Direct Current power supply device, in the meantime, to charge the battery inside the High Voltage Direct Current power supply device, and to supply power to the DC Grid; mode C, the battery inside the High Voltage Direct Current power supply device discharging, to supply power to the load connected with the High Voltage Direct Current power supply device, in the meantime, the High Voltage Direct Current power supply device inputting DC from the DC Grid, to supply power to the load connected with the High Voltage Direct Current power supply device; mode D, the High Voltage Direct Current power supply device inputting DC from the DC Grid, to supply power to the load connected with the High Voltage Direct Current power supply device, in the meantime, to charge the battery inside the High Voltage Direct Current power supply device;

Step 2: Multiple High Voltage Direct Current power supply devices being deployed, each High Voltage Direct Current power supply device parallel connected via DC Grid, in the meantime, at least one High Voltage Direct Current power supply device being configured to not connect with the load;

Step 3: The power supply mode of the High Voltage Direct Current power supply device that initially set to not connect with load being mode B, and the power supply mode of the High Voltage Direct Current power supply device that connects with load being mode A;

Step 4: The first detection node and the second detection node are configured on each High Voltage Direct Current power supply device;

Step 5: When one certain first detection node showing that the fault of AC input of the mentioned High Voltage Direct Current power supply device or the fault of the conversion from AC into DC, step 6 shall be proceeded; when one certain first detection node showing that the overload of the mentioned High Voltage Direct Current power supply device, step 7 shall be proceeded; when the entire second detection node showing that the output current from the mentioned High Voltage Direct Current power supply device to DC Grid reaching to the maximum load, step 8 shall be proceeded; when the first detection node and the second node of any High Voltage Direct Current power supply device showing normally, step 9 shall be proceeded;

Step 6: Change the power supply mode of the mentioned High Voltage Direct Current power supply device from mode A to mode D;

Step 7: Change the power supply mode of the mentioned High Voltage Direct Current power supply device from mode A to mode C;

Step 8: Additionally select a High Voltage Direct Current power supply device in mode A with the lowest load in the current time, and change the power supply mode of the mentioned High Voltage Direct Current power supply device to mode B;

Step 9: Recover the power supply mode of the mentioned High Voltage Direct Current power supply device to the power supply mode initially set in step 3.

Further, the mentioned High Voltage Direct Current power supply device contains rectifier, battery, battery management module, monitoring module, DC Grid interface, load interface, and the mentioned rectifier connects with the mentioned AC power source, in the meantime, it is configured that the mentioned rectifier connecting with the mentioned monitoring module; the mentioned monitoring module is configured to connect with the DC Grid interface and load interface, and is configured to connect with the battery via the battery management module; the mentioned battery management module is responsible to control the charging and discharging of battery, the mentioned load interface is used to connect with the load, the mentioned DC Grid interface is used to connect with DC Grid, the mentioned rectifier is used to convert AC into DC; the mentioned monitoring module is configured to monitor and manage the rectifier, battery management module, battery status, electricity consumption status of load, and power supply status of DC Grid, and to adjust and change the power supply mode.

Further, the mentioned first detection node is configured on the connection position of the rectifier module and monitoring module of the mentioned High Voltage Direct Current power supply device; and the mentioned second detection node is configured on the connection position of the mentioned High Voltage Direct Current power supply device and the DC Grid.

It is understood that, for the normal technical personnel of this domain, the improvement or modification could be conducted as per the above-mentioned contents, and the mentioned entire improvement and modification are within the protection scope of the claims of this invention.

What is claimed is:

1. A Network Distributed High Voltage Direct Current (HVDC) power supply management method comprising the following steps:

Step 1: pre-setting four power supply modes pre-set a High Voltage Direct Current power supply device:

mode A, a rectifier module in the High Voltage Direct Current power supply device converting AC into DC to supply power to a load connected with the High Voltage Direct Current power supply device, in the meantime, to charge a battery inside the High Voltage Direct Current power supply device;

mode B, the rectifier module in the High Voltage Direct Current power supply device converting AC into DC to supply power to the load connected with the High Voltage Direct Current power supply device, in the meantime, to charge the battery inside the High Voltage Direct Current power supply device, and to supply power to a DC Grid;

mode C, the battery inside the High Voltage Direct Current power supply device discharging, to supply power to the load connected with the High Voltage Direct Current power supply device, in the meantime, the High Voltage Direct Current power supply device inputting DC from the DC Grid, to supply power to the load connected with the High Voltage Direct Current power supply device;

mode D, the High Voltage Direct Current power supply device inputting DC from the DC Grid, to supply power to the load connected with the High Voltage Direct Current power supply device, in the meantime, to charge the battery inside the High Voltage Direct Current power supply device;

Step 2: multiplying High Voltage Direct Current power supply devices being deployed, each High Voltage Direct Current power supply device parallel connected via the DC Grid, in the meantime, at least one High Voltage Direct Current power supply device being configured to not connect with the load;

Step 3: setting the power supply mode of the High Voltage Direct Current power supply device that initially set to not connect with the load to mode B, and setting the power supply mode of the High Voltage Direct Current power supply device that connects with the load to mode A;

Step 4: configuring a first detection node and a second detection node each High Voltage Direct Current power supply device;

Step 5: proceeding to step 6 when the first detection node shows a fault of an AC input of the High Voltage Direct Current power supply device or a fault of the conversion from AC into DC;

proceeding to step 7 when the first detection node shows an overload of the High Voltage Direct Current power supply device;

proceeding to step 8 when the second detection node shows that the output current from the High Voltage Direct Current power supply device to DC Grid reaches a maximum load proceeding to step 9 when the first detection node and the second node of the High Voltage Direct Current power supply device shows a normal operation;

Step 6: changing the power supply mode of the High Voltage Direct Current power supply device from mode A to mode D;

Step 7: changing the power supply mode of the High Voltage Direct Current power supply device from mode A to mode C;

Step 8: selecting an additional High Voltage Direct Current power supply device in mode A with a lowest load in a current time, and changing the power supply mode of the additional High Voltage Direct Current power supply device to mode B;

Step 9: recovering the power supply mode of the High Voltage Direct Current power supply device to the power supply mode initially set in step 3, wherein the High Voltage Direct Current power supply device comprises a rectifier, the battery, a battery management module, a monitoring module, a DC Grid interface, a load interface, and the rectifier connects with the AC power source, in the meantime, the rectifier being configured that the rectifier connecting with the monitoring module; the monitoring module being configured to connect with the DC Grid interface and load interface, and being configured to connect with the battery via the battery management module; the battery management module being responsible to control the charging and discharging of the battery, the load interface being used to connect with the load, the DC Grid interface being used to connect with the DC Grid, the rectifier being used to convert AC into DC; the monitoring module being configured to monitor and manage the rectifier, the battery management module, a battery status, an electricity consumption status of load, and a power supply status of DC Grid, and adjust and change the power supply mode.

2. A Network Distributed High Voltage Direct Current power supply management method as mentioned in the claim 1, wherein the first detection node is located on a connection position of the rectifier module and the monitoring module of the High Voltage Direct Current power supply device; the second detection node is located on a connection position of the High Voltage Direct Current power supply device and the DC Grid.

* * * * *